US007743249B1

(12) United States Patent  (10) Patent No.: US 7,743,249 B1
Zucker et al.  (45) Date of Patent: *Jun. 22, 2010

(54) METHOD OF SECURING A DOCUMENT IN A SYSTEM AND CONTROLLING ACCESS TO THE DOCUMENT AND A SEAL FOR USE IN THE METHOD

(75) Inventors: Daniel F. Zucker, Palo Alto, CA (US); Martin M. Atalla, Atherton, CA (US); Donald S. Adams, Pleasanton, CA (US)

(73) Assignee: TriStrata Security, Inc., Atherton, CA (US)

( * ) Notice: Subject to any disclaimer, the term of this patent is extended or adjusted under 35 U.S.C. 154(b) by 609 days.

This patent is subject to a terminal disclaimer.

(21) Appl. No.: 11/706,571

(22) Filed: Feb. 14, 2007
(Under 37 CFR 1.47)

Related U.S. Application Data

(63) Continuation of application No. 11/123,751, filed on May 6, 2005, now Pat. No. 7,257,706, which is a continuation of application No. 09/370,384, filed on Aug. 9, 1999, now Pat. No. 6,912,655.

(51) Int. Cl.
 *H04L 9/08* (2006.01)
 *H04K 1/00* (2006.01)
(52) U.S. Cl. ..................... 713/163; 713/181
(58) Field of Classification Search .............. 713/181
 See application file for complete search history.

(56) References Cited

U.S. PATENT DOCUMENTS 4,607,137 A  8/1986  Jansen (Continued)

FOREIGN PATENT DOCUMENTS

DE  4243908 A1  6/1994

(Continued)

OTHER PUBLICATIONS

Gifford, David K., "Cryptographic Sealing for Information Secrecy and Authentication", Apr. 1982, Communications of the ACM, pp. 274-286.*

(Continued)

*Primary Examiner*—Matthew B Smithers
(74) *Attorney, Agent, or Firm*—Haynes and Boone, LLP

(57) ABSTRACT

An efficient multicast key management is achieved by using seals. A security server generates a seal. In one embodiment, the seal contains a key. In another embodiment, the seal contains information for generating a key. An application server requests the seal from the security server and broadcasts the seal to a plurality of recipients. A recipient wishing to encrypt or decrypt a data stream transmits the received seal to the security server to be opened. If the recipient is authorized, the security server transmits a permit to the authorized recipient. In one embodiment, the recipient generates a key from the permit. In another embodiment, the permit is the key. If the recipient is a sender, the recipient encrypts data using the key and broadcasts the same encrypted data stream to all receivers. If the recipient is a receiver, the recipient decrypts an encrypted data stream using the key. In one embodiment, a seal with a corresponding offset value is sent periodically in a data stream. In another embodiment, multiple instances of identical seals are opened only once. In yet another embodiment, a seal is appended to each datagram packet. In a further embodiment, a seal is appended to any data stream.

13 Claims, 5 Drawing Sheets

U.S. PATENT DOCUMENTS

| | | |
|---|---|---|
| 4,679,236 A | 7/1987 | Davies |
| 4,853,962 A | 8/1989 | Brockman |
| 4,878,246 A | 10/1989 | Pastor et al. |
| 4,972,472 A | 11/1990 | Brown et al. |
| 4,991,087 A | 2/1991 | Burkowski et al. |
| 5,081,677 A | 1/1992 | Green et al. |
| 5,115,467 A | 5/1992 | Esserman et al. |
| 5,120,939 A | 6/1992 | Claus et al. |
| 5,199,073 A | 3/1993 | Scott |
| 5,245,658 A | 9/1993 | Bush et al. |
| 5,297,207 A | 3/1994 | Degele |
| 5,351,293 A | 9/1994 | Michener et al. |
| 5,393,062 A | 2/1995 | Cember |
| 5,414,771 A | 5/1995 | Fawcett, Jr. |
| 5,561,713 A | 10/1996 | Suh |
| 5,602,915 A | 2/1997 | Campana et al. |
| 5,748,736 A | 5/1998 | Mittra |
| 5,778,416 A | 7/1998 | Harrison et al. |
| 5,832,228 A | 11/1998 | Holden et al. |
| 5,960,086 A | 9/1999 | Atalla |
| 6,041,408 A | 3/2000 | Nishioka et al. |
| 6,088,449 A * | 7/2000 | Atalla ......................... 380/273 |
| 6,148,404 A | 11/2000 | Yatsukawa |
| 6,195,751 B1 | 2/2001 | Caronni et al. |
| 6,275,859 B1 | 8/2001 | Wesley et al. |
| 6,330,671 B1 | 12/2001 | Aziz |
| 6,948,070 B1 | 9/2005 | Ginter et al. |

FOREIGN PATENT DOCUMENTS

| | | |
|---|---|---|
| EP | 032107 A1 | 7/1981 |
| EP | 0447063 A2 | 9/1991 |
| EP | 0602335 A2 | 6/1994 |
| GB | 2223614 A | 4/1990 |
| NL | A 9200876 | 12/1993 |
| WO | WO 95/09498 | 4/1995 |
| WO | WO 97/16902 | 5/1997 |

OTHER PUBLICATIONS

McGovern, T., "Varying Encryption Keys for a Single Call," Motorola Technical Developments, vol. 24, Mar. 1995, pp. 61-62.

Merkel, R.C., "Secure Communications Over Insecure Channels," Communications of the ACM, vol. 21, No. 4, Apr. 1978, pp. 294-299.

Radlo, E.J., "Cryptography in Cyberspace," New Matter, vol. 20, No. 3, Jul. 24, 1995, pp. 44-48.

Schneier, B. Applied Cryptography: protocols, algorithms, and source code in C, John Wiley & Sons, Inc., 1$^{st}$ Ed., 1994, pp. 42-65.

Tsubakiyama, H. and Kogo, K., "Security for Information Data Broadcasting System with Conditional-Access Control," IEEE, 1993, pp. 164-170.

Wadzinske, "Key Pointer Rekeying," Motorola Technical Developments, vol. 25, Jul. 1995, p. 136.

* cited by examiner

METHOD OF SECURING A DOCUMENT IN A SYSTEM AND CONTROLLING ACCESS TO THE DOCUMENT AND A SEAL FOR USE IN THE METHOD

CROSS-REFERENCE TO RELATED APPLICATION

The present application is a continuation of U.S. patent application Ser. No. 11/123,751 filed May 6, 2005 by Daniel F. Zucker entitled "Method of Securing a Document in a System and Controlling Access to the Document and a Seal for Use in the Method", which is a continuation of U.S. patent application Ser. No. 09/370,384 filed Aug. 9, 1999 by Daniel F. Zucker entitled "Network Security Architecture System Utilizing Seals" which is incorporated herein by reference in its entirety.

FIELD OF THE INVENTION

This invention relates to secure communications and in particular to systems and methods for multicast key management.

BACKGROUND OF THE INVENTION

Broadcast or multicast is the transmission of data from a single sender to multiple recipients, with broadcast transmission being a "one-to-all" transmission and multicast transmission being a "one-to-many" transmission. In this application, "multicast" and "broadcast" will be used interchangeably.

FIG. 1 shows a typical multicast system 110 using conventional cryptography which is oriented toward point to point encryption. In a multicast system which uses point to point encryption, if party A wants to send data to parties B, C and D, party A must somehow communicate a secret key individually to each of the parties B, C and D such that no one else knows the key.

In the Public Key Infrastructure (PKI) cryptography, party A uses a common symmetric key K for all three transmissions, but sends this common symmetric key K three different times encrypted individually for each of the parties B, C and D. To do this encryption, party A makes use of first, second, and third keys, each different, for parties B, C and D, respectively. Each such key is called a "public key." The public key is part of the public/private key pair that has been previously established using conventional methods. For example, party A uses the public key for party B to encrypt a random common symmetric key K and then sends the encrypted common symmetric key 100 so encrypted to party B. Party A then uses the public keys for parties C and D to encrypt the random common symmetric key K to form encrypted common symmetric keys 102 and 104, respectively, and sends the encrypted common symmetric keys 102 and 104 to parties C and D, respectively. Party A then encrypts a message using the random common symmetric key K and broadcasts the encrypted message to all listeners. Parties B, C and D can now use their respective private keys to decrypt the encrypted common symmetric key K and then use the decrypted common symmetric key K to decrypt the broadcast message.

Alternatively, party A broadcasts the encrypted broadcast message 202 and the encrypted common symmetric keys 204 for each intended recipient, i.e., encrypted common symmetric keys 100, 102, and 104, to all listeners B, C and D, as shown in FIG. 2. A listener, for example, party B, then either tries to decrypt all the encrypted common symmetric keys using his private key, looking for the encrypted common symmetric key specifically encrypted for him, or, he looks for his name followed by an encrypted common symmetric key if party A does not care about public knowledge of "who gets what message." Party B can then use the decrypted common symmetric key K to decrypt the broadcast message. An unintended recipient cannot find an encrypted common symmetric key that is encrypted for him, and thus is unable to decrypt the broadcast message.

The point to point encryption approach to multicast described above is sufficient if the recipients are few. However, the point to point encryption approach becomes difficult to manage as the number of the recipients increases. For example, if there are 10,000 recipients instead of three, party A would need to encrypt the single random symmetric key K 10,000 times using 10,000 public keys. As a result, key management, which involves the selection, distribution and maintenance of the encryption keys, and security becomes difficult and impractical.

Therefore, what is needed is an efficient multicast key management system.

SUMMARY OF THE INVENTION

In accordance with the present invention, a method for efficient multicast key management is provided. The security server establishes a private access line ("PAL") which provides client I.D. and authentication between a client and the security server. The system allows the transmission of what are called "permits" and "seals" to allow the storage of secured documents and the accessing of secured documents by authorized clients or for secured messaging between clients.

As part of the security associated with the security server, the security server generates what is called a "seal." In one embodiment, the seal contains a key. In another embodiment, the seal contains the information to generate a key. The security server encodes this key or information to generate this key using any encryption method. The encoded key is called a "seal" which is generated by the security server. In one embodiment, the seal contains additional information, such as a user identification code, a policy which is a description as to who is allowed access to what (e.g., classification of files and security levels of clients), a message digest which is a hash of files (i.e., containing a "fingerprint" of a data stream), and a date/time stamp. The key or the information to generate the key is often called a "permit," so the permit is contained within the seal but may not be the exclusive contents of the seal. All the information contained in a seal is encrypted by the security server and can only be "opened," i.e., decrypted, by the security server which encrypted the seal.

In accordance with this invention, the security server generates seals and permits. These seals and permits are communicated between the security server and a security client. The security client may be, for example, an application server or an application client. The application server and application client pair can be a web server and web client pair, a lotus notes server and lotus notes client pair or a database server and database client pair. The application server first sends a request to the security server requesting a seal for a particular communication. The security server returns a seal to the application server which then broadcasts the seal to a plurality of application clients. Each client wishing to encrypt or decrypt a data stream sends the seal it received from the application server to the security server in an open seal request signal, together with the client's identification information, so that the seal can be "opened." The security server, upon receiving the open seal request signal, decrypts the seal and compares the client's identification with the policy stored at the security server. If the client's identification matches the policy, the security server extracts a permit from the decrypted seal and transmits the permit to the client in clear text form. In one embodiment, the client then uses the permit to generate an encryption/decryption key for encrypting a data stream or decrypting an encrypted data stream. If the client is a sender, he broadcasts the encrypted data stream together with the seal to all the listeners, regardless of the identity or the number of recipients because an unauthorized recipient will not be sent a permit from the security server.

In one embodiment, the same seal is sent periodically in an encrypted data stream. An offset value indicating an offset with respect to the beginning of an encrypted message is sent with each seal to enable the recipient to determine the portion of the data stream from where the decryption begins. This allows decryption of at least a portion of an encrypted data stream that is received partially.

In another embodiment of the invention, a copy of a seal that has been "opened" and its corresponding permit are cached and stored locally in the memory of the security client, the memory being denoted as a local seal cache. The next time a seal needs to be opened at the security client, the seal is first compared to all the seals stored in the local seal cache by, e.g., a byte-for-byte value comparison. If a match is found, a permit corresponding to the matched seal is returned from the local seal cache. Conversely, if there is no match, a request-to-open seal signal is sent to the security server to open the seal. If it has been established that the security client's identification matches the policy, the seal is opened. The newly opened seal and its corresponding permit are then stored in the local seal cache. When the local seal cache exceeds its capacity, the least recently used seal and permit pair is deleted from the local seal cache before the most recently opened seal and permit pair is stored.

In yet another embodiment of the invention, a seal is attached to every individual datagram packet in a UDP (User Datagram Protocol) system so that the order in which the packets are received does not have any significance because each packet is encrypted/decrypted individually. Similarly, a lost datagram packet does not affect the integrity of the encryption (although it might affect the integrity of the received data unless the data is resent.) In this embodiment, the server and the client do not need to negotiate a symmetric session key and an encryption algorithm upon each session initiation because every packet has its own seal and can be decrypted individually and independently from the other packets.

In another embodiment of the invention, a separate seal is appended to the head of any data stream, allowing full duplex communication. When the data with appended seal is received, the recipient sends the seal to the security server to be opened and uses the resulting permit received from the security server to decrypt the encrypted data. No synchronization or handshake protocol between the two duplex channels is required since the data sent in each direction has its own corresponding seal.

This invention will be more fully understood in light of the following detailed description taken together with the following drawings.

BRIEF DESCRIPTION OF THE DRAWINGS

The use of the same reference symbols in different drawings indicates similar or identical items.

DETAILED DESCRIPTION

The following description is meant to be illustrative only and not limiting. Other embodiments of this invention will be obvious in view of the following description to those skilled in the encryption arts.

Figure 1:
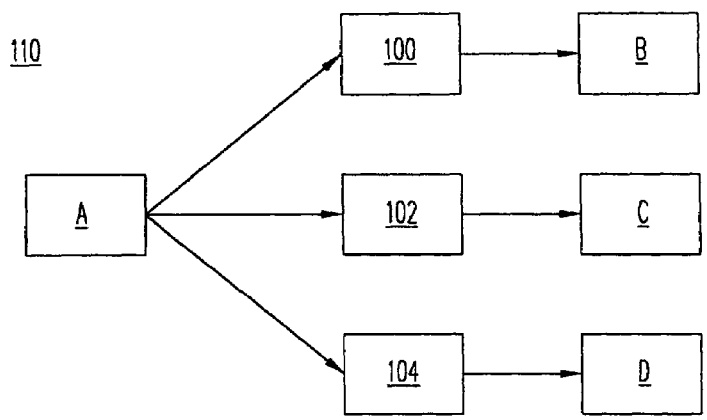
FIG. 1 (prior art) shows a multicast system utilizing point to point cryptography.
Figure 2:
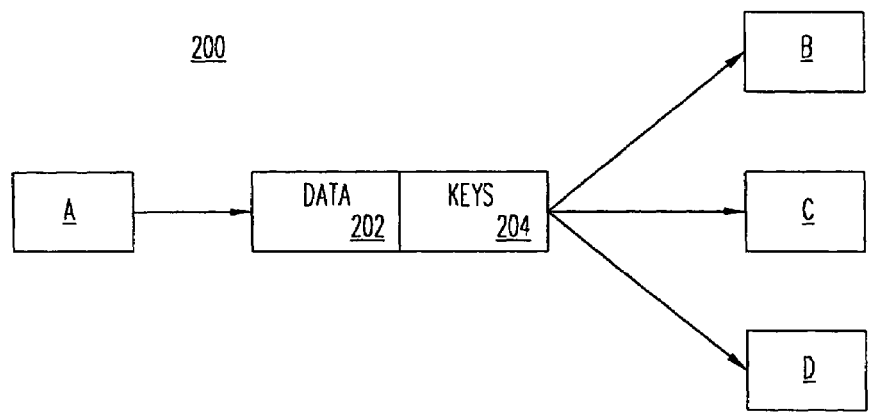
FIG. 2 (prior art) shows an embodiment of a multicast system utilizing point to point cryptography.
Figure 3A:
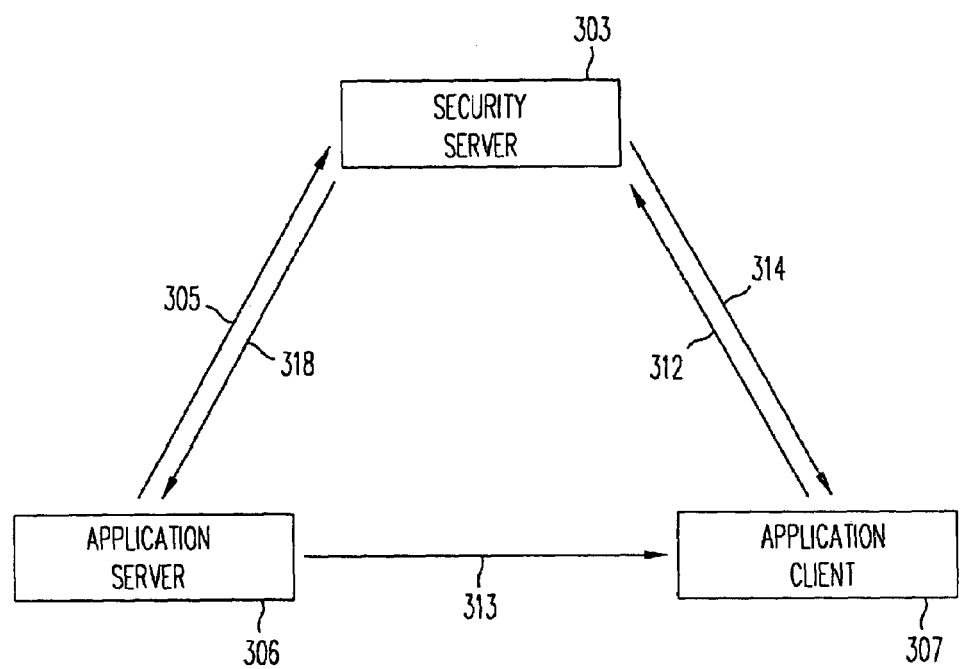
FIG. 3A shows communication between a security server, an application server and a client.
Figure 3B:
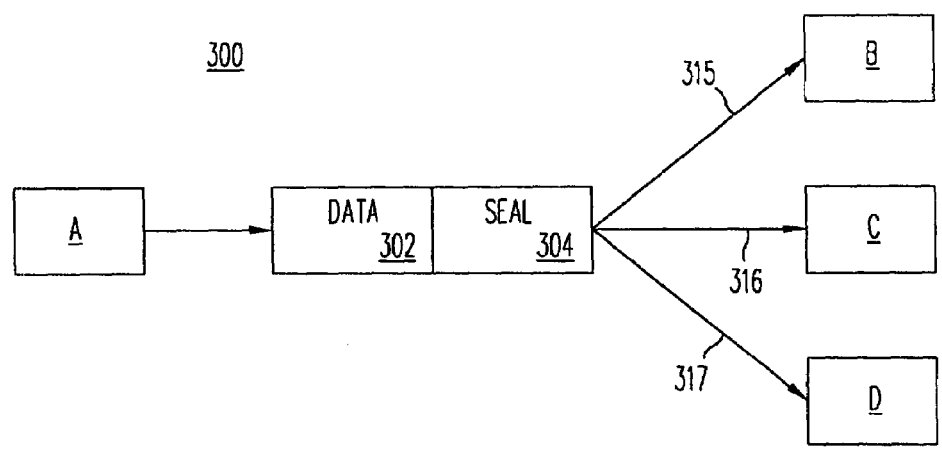
FIG. 3B shows a multicast system in accordance with one embodiment of the present invention, wherein the same data stream is sent to all the recipients.

FIGS. 3A and 3B illustrate a multicast system in accordance with the present invention. FIG. 3A shows a communication infrastructure using a security server 303 called TESS (TriStrata Enterprise Security Server) developed by TriStrata Security Inc. Security server 303 allows the transmission of what are called "seals" and "permits" to allow the storage of secured documents and the accessing of secured documents by authorized clients or for secured messaging between clients. The permit is essentially a key. The seal contains the encrypted permit and in some embodiments, additional client information. Seals and permits are described in detail below.

In one embodiment, secure communication between security server 303 and an application server 306 and communication between security server 303 and an application client 307 are accomplished by establishing a private access line (PAL) between security server 303 and application server 306 and a private access line between security server 303 and application client 307, respectively. Application server 306 is, for example, a web server, lotus notes server or database server. Application client 307 is, for example, a web client, a lotus notes client or a database client. It is noted that both application server 306 and application client 307 are security clients of security server 303.

In general, all secure communications between a client machine and a server machine (e.g., between an application server and an application client) are intercepted at the transmission control protocol/internet protocol sockets level and passed to the virtual private network machine for processing.

In one embodiment, the private access line is established by using a pointer exchange process described in U.S. Pat. No. 5,960,086 issued Sep. 28, 1999 (hereinafter the '086 Patent) which is assigned to the same assignee as this application and is herein incorporated by reference in its entirety.

In the '086 Patent, systems and methods are provided which allow a working key (i.e. the key used to encrypt a data stream) to be used only once and then changed in a manner which is essentially random, fast and unique to each client. In accordance with the invention disclosed in the '086 Patent, a client accessing a network computer is issued a randomly selected bit stream of a given length. This bit stream, called the "master signature," is divided into bytes, and each byte is assigned a unique byte address. When this byte is addressed, the bits associated with this byte can be read out. In one embodiment of the '086 Patent, a split signature, asymmetric mode technique is used to secure communications between a computer and client. From the computer's "master signature," a portion, called the "access signature," is selected and placed at the client. The computer, which could be at a bank or any service provider, retains the corresponding addresses filed under the client's I.D. This access signature includes both the bit information in the bytes selected from the master signature as well as the addresses of those bytes in the master signature. To securely communicate between a bank and a client, each selects a random set of addresses from the client's access signature. These independent sets of addresses are exchanged between sides. Each side, the bank and the client, now having both sets of addresses, obtains the corresponding bits which determine a unique session signature. Of importance, the particular bytes making up the session signature are never transmitted between the bank computer and the client. All that is transmitted are the addresses of the bytes making up the session signature. Both the client's terminal and the bank's computer have the identical session signature (also called the "session key").

One way to transmit the seals is discussed in U.S. Pat. No. 6,088,449 issued Jul. 11, 2000 (hereinafter the '449 Patent) which is assigned to the same assignee as this application and is herein incorporated by reference in its entirety. The '449 Patent discloses an improvement on the '086 Patent wherein the session signature (i.e. key) is uniquely generated from a segment of the access signature by identifying the address of the initial byte in the session signature and the length of the session signature (i.e. the number of bytes or bits in the session signature) using a pointer. As a result, the number of bits required to transmit the addresses of bytes in the session signature is reduced substantially. The pointer defines both the address of the initial byte in the session signature and the number of bytes in the session signature. If desired, the session signature can be of a predefined length, or the session signature can be as long as the maximum length message, rendering unnecessary the bits in the pointer defining the length of the session signature.

In one embodiment of the '449 Patent, a master signature is divided into two subsets of bytes and each subset is stored in a separate compartment. These two compartments, known as the "shared key buckets," are available to and shared with all clients authorized to use the bytes in the shared key buckets for encrypting information. Another two compartments of bytes called the "DES-keys buckets" reside securely only in the security server. The client accesses the security server and uses the pointer exchange process to establish a private access line which provides identification and authentication between the client and the security server. The security server issues to the client a permit which is a pair of pointers P1, P2 randomly selected from the two compartments of the shared key bucket. These pointers P1, P2 are transmitted to the client over the previously established PAL.

The client having received P1, P2 and having the shared key bucket thereby is able to determine the encryption key. The client then uses the encryption key so derived to encrypt the document to be stored in memory somewhere in the system. The server also derives two DES-keys from the DES-key bucket. These two DES-keys are determined by two separate pointers p1, p2, independent of pointers P1, P2 used to derive the session signature from the shared key bucket. A derived DES-key is obtained by exclusively ORing the two DES-keys. The DES-key so derived is used to encrypt P1, P2 to provide a seal. The document, encrypted by the encryption key (i.e. the session signature) at the client, is then stored in memory in the system along with P1, P2 encrypted at the server by the DES-key to provide a seal, and the DES-key pointers p1 and p2.

The procedure which is followed for an authorized client to decrypt a document so secured is to:

1. pull the encrypted document, seal and p1, p2 from memory;
2. establish a PAL between the client and the security server;
3. transmit the seal and DES pointers from storage to the security server;
4. security server unlocks seal and transmits pointers P1, P2 to the client (the seal besides including P1, P2 can also include other data such as the time stamp and the client I.D.); and
5. client decrypts the document using pointers P1, P2.

Another U.S. patent application Ser. No. 09/095,350 (hereinafter the '350 application), filed Jun. 9, 1998, now abandoned, which is assigned to the same assignee as this application, discloses a further improvement for the security architecture system described above and is herein incorporated by reference in its entirety. The improved security architecture system utilizes pointers and employs a method for generating encryption bits from a set of bits in such a manner as to avoid redundancy and to obtain a large number of encryption bits from the given set of bits. In one embodiment, the pointer is made up of eight bits and the session signature to be identified by the address contained in the pointer is of a predefined length. Accordingly, no bits are required in the pointer to define the length (i.e. the number of bytes) in the session signature. All that is required is the address of the first byte in the session signature. Importantly, the string of bits defining the pointer includes one additional bit. Accordingly, additional pointers can be generated from this string of bits by shifting this string of bits one space and generating a new pointer from the shifted bit string. Repeating this shifting a number of times equal to the number of bits in the string yields an additional number of pointers equal to the number of bits in the string. When the original bit string is obtained, the string of bits is discarded to avoid defining a session signature already used. A second string of bits comprising a pointer plus one extra bit is then sent to the client from the central computer and used to again define additional session signatures.

In general, security server 303 generates a seal which contains encrypted information such as, but not limited to, permit, policy, message digest and date/time stamp. It is noted that the entire content of the seal is encrypted at security server 303 using any encryption method or standard, such as Data Encryption Standard (DES) and triple DES. The seal can only be "opened" by security server 303, and cannot be interpreted unless security server 303 opens it. The seal open process is discussed in detail later.

The permit is a set of bits containing information relating to an encryption/decryption key. For example, the permit may contain pointers that are used to generate the encryption/decryption keys, as discussed in the '086 and '449 Patents and '350 application, incorporated by reference above. The permit may also contain the encryption/decryption key itself. The policy contains description as to who is allowed access to what, for example, the policy may contain classification of files or security levels for a client. The message digest is a hash of files, meaning that it contains a "fingerprint" of a data stream.

Referring to FIG. 3A, application server 306 first sends a seal request signal to security server 303 via a private access line 305, requesting a seal. Security server 303 sends a seal to application server 306 via private access line 318. Application server 306, after receiving the seal, sends the seal to application client 307 via communication line 313. Application client 307 receives the seal and sends a request-to-open-seal signal to security server 303 via private access line 312. Security server 303 verifies the status of application client 307 and sends a permit back to application client 307 via private access line 314. If the permit is an encryption/decryption key, the permit is used to encrypt/decrypt a message. If the permit contains information of an encryption/decryption key but not the key itself, application client 307 first generates an encryption/decryption key from the permit. Application client 307 then uses the generated encryption/decryption key to encrypt/decrypt a message.

In a multi-user system, the application server, e.g., party A, in one embodiment, broadcasts the seal to a plurality of application clients, e.g., parties B, C and D. When party A, e.g., application server 306, desires to encrypt a data stream, party A sends a request-for-seal signal 312, together with party A's identification to security server 303. Security server 303 compares the requested policy against party A's identification and policy to determine if party A is authorized to receive the seal. If security server 303 determines that party A is an authorized client, security server 303 returns a permit in clear text form with the requested seal via private access line 318 to party A. In one embodiment, as shown in FIG. 3B, for example, party A generates an encryption key (or session key) from the permit in a manner such as described in the above referenced patent applications. Party A then uses the encryption key to encrypt a data stream. Next, party A broadcasts the encrypted data stream 302 with an appended seal 304 to, e.g., parties B, C and D via communication lines 315, 316 and 317, respectively.

Parties B, C and D receive the same encrypted data stream and seal from party A. Each party B, C and D then individually sends the received seal 304 to the security server (not shown) to establish a PAL between each party B, C and D and the security server. As discussed above, only an authorized client receives a permit from the security server. For example, if party B is authorized, party B receives a permit from the security server. Party B can then use the permit to generate a decryption key that is the same as the encryption key generated by party A. Party B can then use the decryption key to decrypt the encrypted data stream. On the other hand, if party C is unauthorized, the security server does not return a permit to party C, and party C cannot generate the decryption key for decrypting the encrypted data stream. Similarly, parties B, C and D can generate encrypted data streams in the same manner as described for party A and broadcast the encrypted data streams to other parties.

By sending a seal instead of an asymmetric key pair, party A broadcasts the same encrypted data stream to all the recipients regardless of the identity or the number of the recipients. Unauthorized recipients are not allowed to open the seal at the security server, and without the appropriate permit, unauthorized recipients are unable to decrypt the encrypted data stream broadcast by party A.

The method described above solves the broadcast key distribution problem. However, the method works only if all the recipients receive the data stream from the beginning because the recipients who begin to receive the data in midstream cannot decipher the data stream since the seal is sent only once at the beginning of the data stream. To solve the problem caused by recipients receiving data from midstream, in accordance with this invention, the same seal is sent periodically in the data stream.

Figure 4:
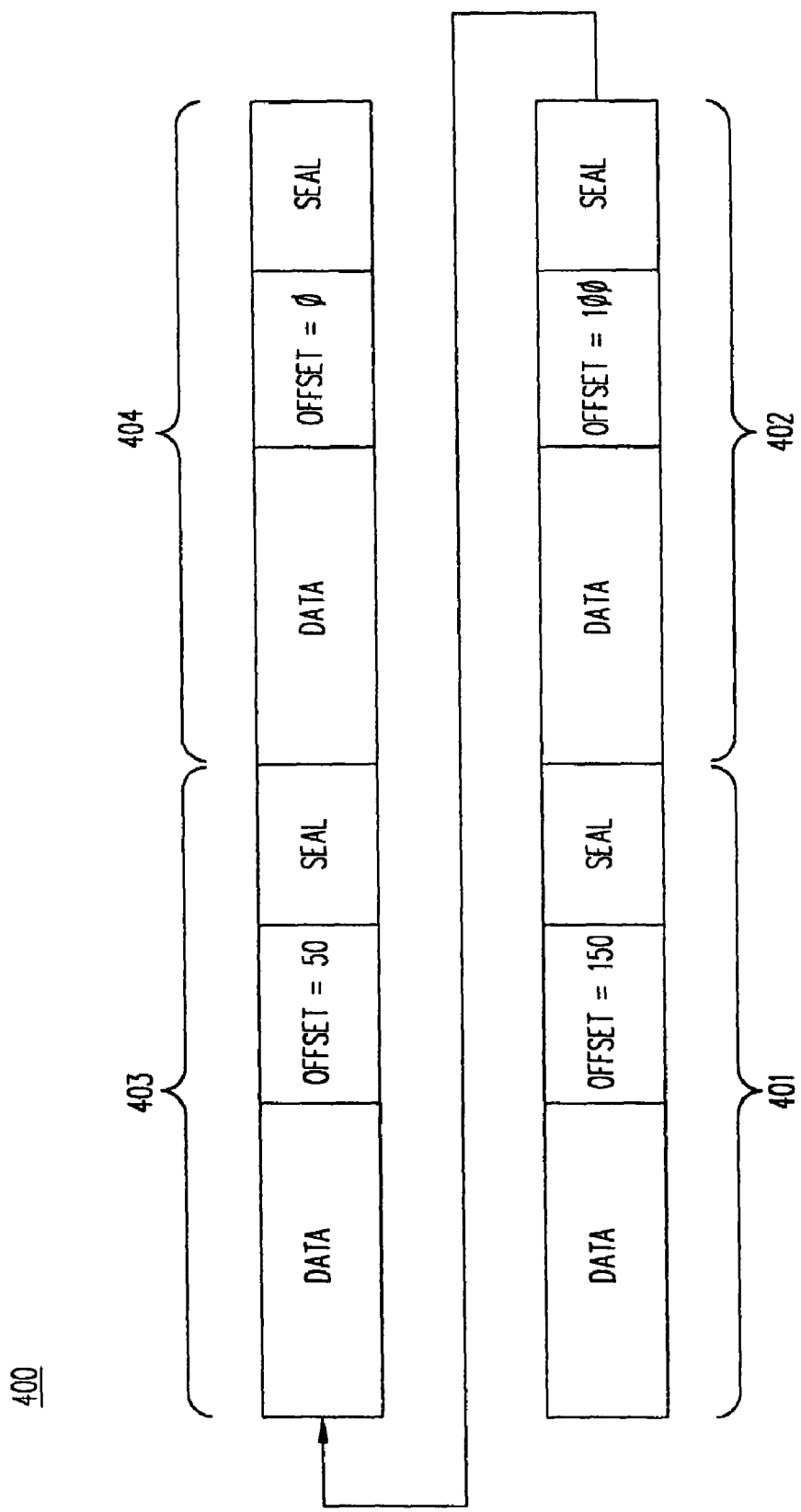
FIG. 4 shows an embodiment where the same seal is sent periodically in the data stream, each seal having a corresponding offset value.

FIG. 4 illustrates a method for efficient synchronization of keys for streaming media such that a recipient can begin decrypting the encrypted stream at selected points in the stream. Streaming media is typically employed for large multimedia files, where a client downloads a portion of a file, decompresses that portion and starts playing the contents, e.g., audio/video, before the rest of the file arrives. Subsequent portions of the multimedia file are downloaded while the previously downloaded portion is playing.

In accordance with this invention, data stream 400 is divided into data sections 401 through 404. Each data section 401 through 404 has a corresponding seal and a corresponding offset value indicating the offset with respect to the starting point of data stream 400, appended to the head of the data section. The offset values enable the recipients to determine where in data stream 400 the decryption begins so that at least a portion of data stream 400 can be decrypted. This is opposed to the method where the seal is only sent once at the beginning of the message, in which case if the beginning of the message is missing, the entire message cannot be decrypted. In an embodiment where the message is re-sent or sent more than once, sending seals periodically along with an offset value prevents the same portion of data stream 400 to be reused, i.e. decrypted more than once.

Figure 5:
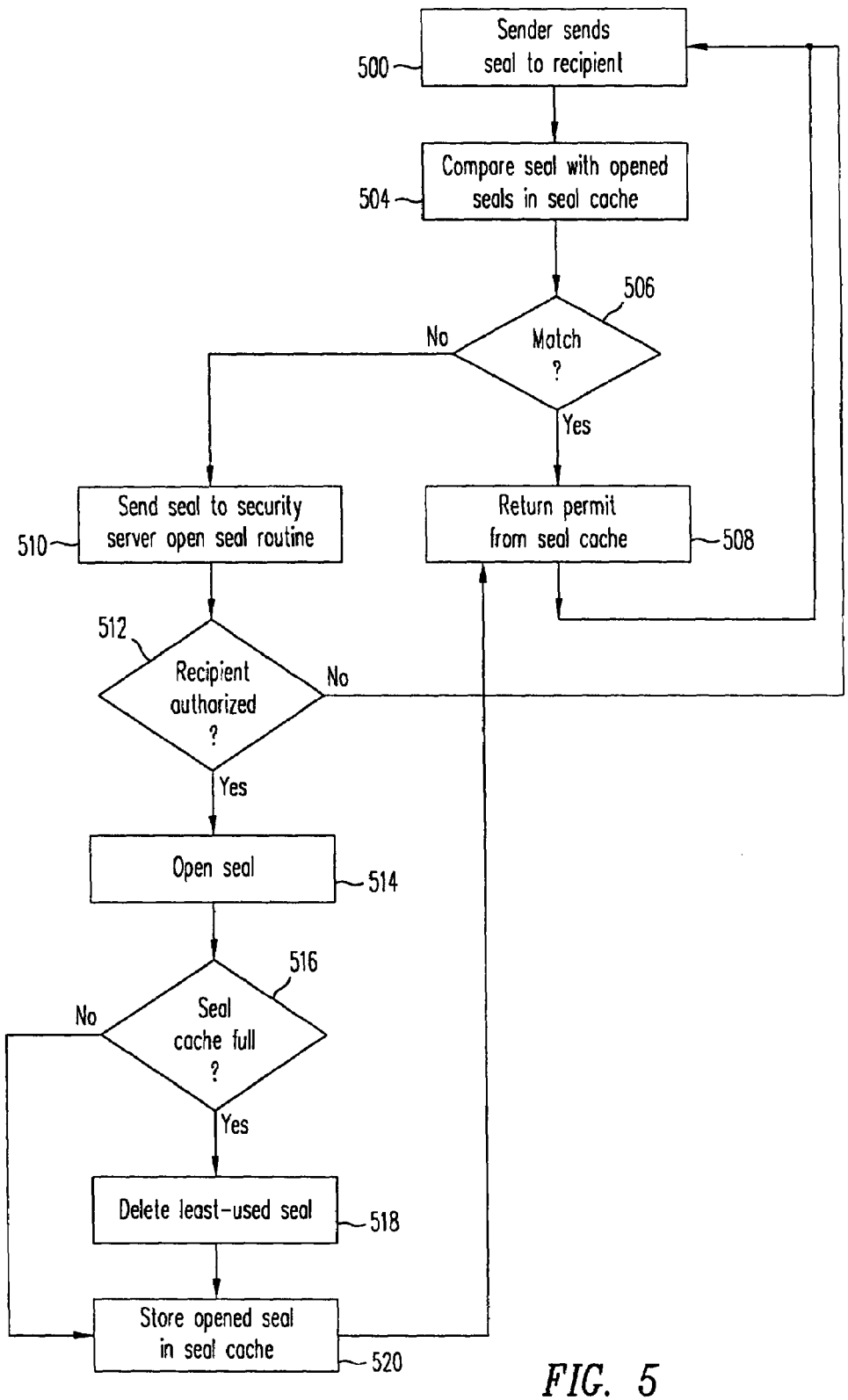
FIG. 5 shows a flow chart illustrating a method for opening multiple instances of identical seals.

FIG. 5 is a flow chart illustrating an embodiment of the present invention, in which seals that have been opened previously are cached and stored in a local seal cache at the security client (e.g., application server and application client) so that multiple copies of the same seal do not have to be opened at the security server each and every time a seal is received by a security client. When the same seal is broadcast at various times, for example, when a seal is sent periodically in the data stream, as that described in conjunction with FIG. 4, a recipient may receive multiple copies of the same seal. One method is to open the seal at the security server each and every time a seal is received by a security client. However, opening the seal at the security server every time a seal is received uses an unnecessary number of transactions to the security server if the same seal is received by a security client multiple times. To operate the system more efficiently, the same seal can be used multiple times but only opened once, by caching the seals that were opened previously.

In step 500, the sender broadcasts a seal to a number of recipients. Each recipient compares the received seal with the seals that have been previously opened and stored in a local seal cache at the recipient (step 504). The local seal cache stores seals that have been opened and also their corresponding permits. In other words, the local seal cache contains seal/permit pairs. The local seal cache can be of any memory size, depending on the size of the seal/permit and the number of seal/permit pairs the user would like to store. The received seal is compared using, e.g., a byte-for-byte value comparison method. If the received seal matches one of the seals stored in the local seal cache (step 506), a corresponding permit is returned from the local seal cache to the recipient (step 508). However, if the received seal does not match any of the seals stored in the local cache, the seal is sent to the seal open routine at the security server (step 510). The security server decrypts the seal and compares the recipient's identity against the policy to determine whether the recipient is authorized (step 512). If the recipient is not properly authorized (step 512), the procedure returns to the beginning to await for another seal to be sent from a sender.

On the other hand, a permit is extracted from the seal if the recipient is properly authorized (step 514). A newly opened seal and its corresponding permit are stored in the local seal cache (step 520) if it has been determined that the seal cache is not full in step 516. If the seal cache is determined to be full (step 516), a least recently used seal and permit pair is deleted from the seal cache (step 518) before the newly opened seal and its corresponding permit are stored in the local seal cache (step 520). The permit is then returned from the seal cache to the recipient (step 508). By using a local seal cache, the system operates more efficiently because the same seal does not need to be opened multiple times by the security server.

Figure 6:
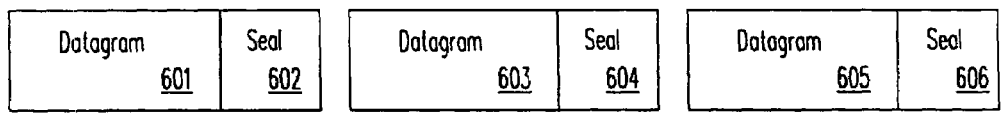
FIG. 6 illustrates key synchronization over an unreliable transport by appending a seal to each datagram packet.

FIG. 6 shows a seal appended to each data packet for a datagram communication. The majority of network security protocols gear toward connection-oriented protocols, e.g., transmission control protocol ("TCP"), because of the unreliable mechanism associated with internet protocol ("IP") for transferring data between two computers. TCP/IP provides a reliable stream of data that is in the exact sequence generated by the source. TCP/IP accomplishes this by breaking the data stream into packets small enough to fit inside IP datagrams which are numbered and sent using an acknowledgment-with-retransmission paradigm, meaning that the receiver sends an explicit or implicit acknowledgment for each IP datagram. The sender waits for some time and then retransmits the IP datagram if it does not receive an acknowledgment. In this scheme, the source port and the destination port must be identified prior to transmission of a data stream.

The minority few cater to datagram communication such as User Datagram Protocol (UDP). UDP is a connectionless datagram protocol and has certain advantages over a connection-oriented protocol such as TCP/IP. For example, in a datagram communication, every packet of data is sent individually from the source to the destination. No connection, e.g., handshaking mechanism, is required for sending a datagram packet. However, the UDP protocol is unreliable because there is no guarantee that a sent packet will arrive at its destination. There is also no guarantee that packets will be received in the same order they are sent. Therefore, UDP encryption either relies on long term host-pair keying or imposes a session-oriented protocol. In addition, setup is needed to establish a shared key.

The present invention provides a simple technique to secure datagram communication without the extra setup in establishing a secure session, wherein a seal is appended onto each individual datagram packet, as shown in FIG. 6. For example, seal 602 is appended onto datagram packet 601; seal 604 is appended onto datagram packet 603; and seal 606 is appended onto datagram packet 605. By allowing each datagram packet 601, 603, 605 to have its own seal 602, 604, 606, respectively, the order in which the datagram packets are received becomes irrelevant because no handshake or synchronization between the sender and the receiver is required. Similarly, a lost datagram packet does not impact the communication or the encryption integrity for the rest of the packets because every packet has its own seal and encryption/decryption for each packet can be accomplished individually and independently from the other packets. Hence, a seal appended to each datagram packet effectively eliminates the need for a connection setup, e.g., synchronizing encryption/decryption keys.

Figure 7:
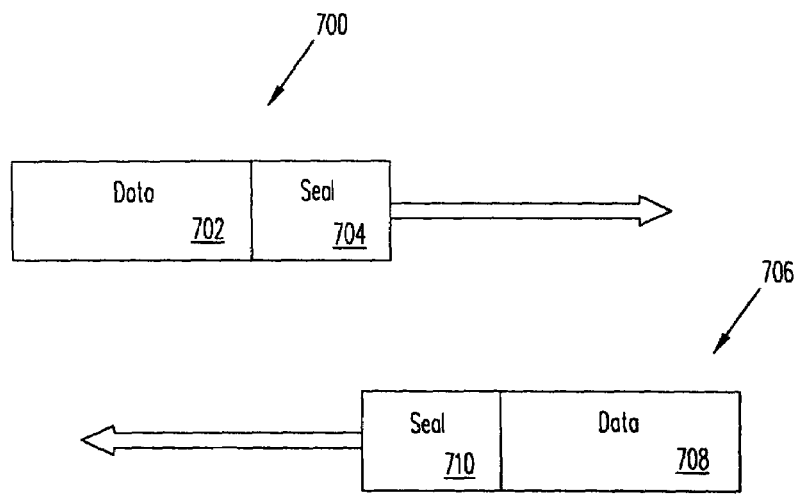
FIG. 7 illustrates key exchange and synchronization over a duplex channel by appending a seal to the head of each data stream.

FIG. 7 illustrates a duplex transmission utilizing seals. In conventional cryptography, the exchange of keys between two communicating entities involves some form of handshake mechanism in which a shared symmetric key is exchanged. The handshake mechanism creates extra overhead which in turn incurs significant time penalties for time critical applications such as teleconferencing. FIG. 7 illustrates a data stream 700 where a seal 704 is appended to the head of data section 702, sent from a first party. Another data stream 706 having a seal 710 appended to the head of data section 708 is sent from a second party. The appending of a seal to the head of a data section allows full duplex communication without the initial exchange of keys, thus avoiding associated costs.

When data section 702 with the appended seal 704 is received at the second party, the second party sends the seal to the security server to be opened. The security server then returns a permit if the second party is an authorized client. The second party can then generate a decryption key from the permit and decrypt the received data 702. Similarly, when data section 708 with the appended seal 710 is received at the first party, the first party sends seal 710 to the security server to be opened. The security server returns a permit extracted from seal 710 if the first party is authorized. The first party then uses the returned permit to generate a decryption key which is then used to decrypt the received data section 708. No synchronization between the first party and the second party is required because the data from each party has its own seal. Furthermore, no handshake protocol is required since no key exchange is required between the first party and the second party.

Although the invention has been described with reference to particular embodiments, the description is illustrative and not limiting. Various other adaptations and combinations of features of the embodiments disclosed are within the scope of the invention as defined by the following claims.

What is claimed is:

1. A system for securing a document stored in a computer system which is part of a network, comprising:
   a storage device storing a seal for association with a document which is to be stored or shared within the computer system or network, said seal comprising;
   a) information identifying a requestor requesting that the document be secured; and
   b) information identifying one or more parties qualified to access the document.

2. The system as in claim 1 wherein said seal further comprises a unique key.

3. The system of claim 2 further comprising means for allowing said key to be used by the requestor to encrypt the document.

4. The system of claim 3 further including means for allowing the requestor to discard the key following the encryption of the document.

5. The system of claim 4 further including means for allowing one or more parties to have access to the document in accordance with the information in the seal.

6. The system of claim 1 further comprising means for adding policy to the seal in the form of control information.

7. A method for sealing and controlling access to a document in a computer system which is part of a network which comprises:
   creating a seal which remains associated with the document when the document is anywhere within the computer system or network;
   placing in the seal information identifying a requestor requesting that the document be secured; and
   placing in the seal information identifying who can one or more parties qualified to access the document.

8. The method of claim 7 further comprising including in said seal information which allows the computer system to identify the name of the document.

9. The method of claim 7 further comprising including in said seal hash information from the document which allows the computer system to check the integrity of the document.

10. The method of claim 7 further comprising including in said seal information which allows the computer system to identify who, whether an individual, hierarchy or group, can access the document.

11. The method of claim 7 further comprising including in said seal information which allows the computer system to identify time or other constraints for access to the document.

12. The method of claim 7 further comprising including in said seal information which allows the computer system to time stamp the document.

13. The method of claim 7 further comprising including in said seal information which allows the computer system to confirm server identity.

* * * * *